(12) United States Patent
Bose et al.

(10) Patent No.: US 10,996,774 B2
(45) Date of Patent: May 4, 2021

(54) METHOD AND APPARATUS FOR PROVIDING INTEROPERABILITY BETWEEN DEVICES

(75) Inventors: Raja Bose, Mountain View, CA (US); Jörg Brakensiek, Mountain View, CA (US)

(73) Assignee: NOKIA TECHNOLOGIES OY, Espoo (FI)

(*) Notice: Subject to any disclaimer, the term of this patent is extended or adjusted under 35 U.S.C. 154(b) by 1497 days.

(21) Appl. No.: 12/771,520

(22) Filed: Apr. 30, 2010

(65) Prior Publication Data

US 2011/0271183 A1 Nov. 3, 2011

(51) Int. Cl.
| | | |
|---|---|---|
| G06F 3/038 | (2013.01) | |
| G06F 3/14 | (2006.01) | |
| H04L 29/08 | (2006.01) | |

(52) U.S. Cl.
CPC .......... G06F 3/038 (2013.01); *G06F 3/1454* (2013.01); *G06F 2203/0383* (2013.01); *H04L 67/025* (2013.01)

(58) Field of Classification Search
None
See application file for complete search history.

(56) References Cited

U.S. PATENT DOCUMENTS

| | | | |
|---|---|---|---|
| 6,704,024 B2* | 3/2004 | Robotham et al. | ........... 345/581 |
| 2004/0239681 A1 | 12/2004 | Robotham et al. | |
| 2006/0077120 A1 | 4/2006 | Domi et al. | |
| 2007/0008302 A1 | 1/2007 | Uchida et al. | |
| 2007/0088727 A1* | 4/2007 | Kindig | .............. G06F 17/30023 |
| 2007/0229465 A1 | 10/2007 | Sakai et al. | |
| 2008/0139195 A1 | 6/2008 | Marsyla et al. | |
| 2008/0215240 A1* | 9/2008 | Howard et al. | ................ 701/213 |

(Continued)

FOREIGN PATENT DOCUMENTS

| | | |
|---|---|---|
| GB | 2 439 753 A | 1/2008 |
| WO | WO 2009/120984 A1 | 10/2009 |

OTHER PUBLICATIONS

"Pseudocustom events in Prototype 1.6" by Painfully Obvious archived Nov. 10, 2007 by the Internet Wayback Machine downloaded from https://web.archive.org/web/20071110225603/http://www.andrewdupont.net/2007/11/07/pseudo-custom-events-in-prototype-16/.*

(Continued)

*Primary Examiner* — Alvin H Tan
(74) *Attorney, Agent, or Firm* — Alston & Bird LLP

(57) ABSTRACT

Methods and apparatus are provided to promote interoperability between devices having different user input devices by correlating user input that is provided via one or more input mechanisms of a client device to touch events on the server device. The method may maintain a terminal session between a server device and a client device in which the client device simulates at least a portion of a display generated at the server device. The method may access a mapping between touch events on the server device and actuation of respective input mechanisms of the client device. The method may also interpret one or more control signals provided in response to actuation of an input mechanism based upon the mapping and may then cause a user interface state of the server device to updated based on the actuation of the input mechanism of the client device.

20 Claims, 4 Drawing Sheets

(56) References Cited

U.S. PATENT DOCUMENTS

| | | |
|---|---|---|
| 2009/0161027 A1 | 6/2009 | Hardacker et al. |
| 2011/0066971 A1* | 3/2011 | Forutanpour et al. ........ 715/788 |
| 2011/0084900 A1 | 4/2011 | Jacobsen et al. |

OTHER PUBLICATIONS

"Painfully obvious: Pseudo-custom events in Prototype 1.6" archived by the Internet Wayback Machine on Nov. 10, 2007 downloaded on Mar. 1, 2016 from https://web.archive.org/web/20071110225603/http://www.andrewdupont.net/2007/11/07/pseudo-custom-events-in-prototype-16.*

"The onmousewheel event of JavaScript" published by the Javascriptkit.com archived by the Internet Wayback Machine Dec. 14, 2009 downloaded from https://web.archive.org/web/20091214102546/http://www.javascriptkit.com/javatutors/onmousewheel.shtml on Aug. 22, 2017.*

International Search Report and Written Opinion for Application No. PCT/FI2011/050327 dated Aug. 19, 2011.

Extended European Search Report for European Patent Application No. 11774469.8 dated Nov. 4, 2016, 10 pages.

Office Action for European Application No. 11 774 469.8 dated Sep. 12, 2018.

Nokia and Continental Automotive Want you to Drive, Tweet and Talk [online] [retrieved Jan. 9, 2018]. Retrieved from the Internet: https://blogs.windows.com/devices/2010/04/14/okia-and-continental-automotive-want-you-to-drive-tweet-and-talk/. (dated Apr. 14, 2010) 5 pages.

Office Action for European Application No. 11 774 469.8 dated Jan. 16, 2018, 6 pages.

\* cited by examiner

METHOD AND APPARATUS FOR PROVIDING INTEROPERABILITY BETWEEN DEVICES

TECHNOLOGICAL FIELD

Embodiments of the present invention relate generally to inter-device communications technology and, more particularly, relate to an apparatus and method for providing interoperability between devices, such as touch devices and non-touch remote environments.

BACKGROUND

Mobile computing devices continue to evolve such that the computing devices are capable of supporting new and powerful applications. Examples include location and mapping technologies (e.g., via Global Positioning System (GPS)), media player technologies (e.g., audio and video), web browsing technologies, gaming technologies, and the like. Mobile computing devices or mobile terminals, such as mobile phones, smart phones, personal digital assistants are evolving into personal media and entertainment centers in the sense that the devices are able to store and present a considerable amount of multimedia content. Moreover, many mobile computing devices support rich interactive games including those with three dimensional graphics.

However, due to the inherently small screen sizes and form factors of mobile computing devices, the user experience can be compromised when using rich applications. As such, solutions have been developed for interfacing a mobile computing device with a remote environment, such as a vehicle head unit, a meeting room, a home living room, etc., that, for example, includes a larger display or a more convenient user interface. As a consequence, the features and capabilities of the mobile component device may be projected into the remote environment and appear as inherent capabilities of the remote environment. The interfacing between the mobile computing device and the remote environment may occur upon entry of the mobile computing device into the remote environment.

While the interoperability between a mobile computing device and a remote environment is frequently advantageous, difficulties may arise in instances in which one of the mobile computing devices or the remote environment has a touch-based user interface, while the other of the mobile computing device or the remote environment does not include a touch-based user interface, but instead includes other types of user input devices, such as buttons, knobs or the like. For example, difficulties may arise with the interoperability between a mobile computing device that has a touch screen and a remote environment that includes other types of user input devices, such as a rotary knob and one or more buttons, but that fails to include a touch screen. In these instances, difficulties may exist in properly interpreting and responding to the user input provided via one of the mobile computing device or the remote environment, since the other of the mobile computing device or the remote environment is not configured to receive comparable types of user inputs.

BRIEF SUMMARY

Methods and apparatus are therefore provided according to example embodiments in order to promote interoperability between devices and, more particularly, to promote interoperability between devices having different user input devices. In an example embodiment, methods and apparatus are provided for correlating user input that is provided via one or more input mechanisms of a client device to touch events on the server device. Thus, appropriate responses may be generated based upon the user input even though the server and client devices utilize different types of user input devices.

In one embodiment, a method is provided that maintains a terminal session between a server device and a client device in which the client device simulates at least a portion of a display generated at the server device. The method may access a mapping between touch events on the server device and actuation of respective input mechanisms of the client device. The method may also interpret one or more control signals provided in response to actuation of an input mechanism based upon the mapping and may then cause a user interface state of the server device to be updated based on the actuation of the input mechanism of the client device. For example, the user interface state may be updated by causing the focus of the display of the server device to be changed. In this embodiment, the display of the client device may also be updated in accordance with the display of the server device. As another example, the updating of the user interface state may include causing an element on the display of the server device to be selected.

As noted above, the method may include accessing the mapping between touch events on the server device and actuation of respective input mechanisms of the client device. In one embodiment, the method may also include receiving an indication of one or more input mechanisms of the client device and a functional category of each input mechanism and then generating the mapping between the touch events on the server device and actuation of respective input mechanisms based upon the functional category of each input mechanism. While each input mechanism may have various functional categories, the functional categories of a respective input mechanism of one embodiment include selection, change in focus or toggle. Along with the indication of one or more input mechanisms of the client device and the functional category of each input mechanism, the method of one embodiment may receive an indication of a range of values associated with one or more input mechanisms such that the mapping that is generated also maps the touch events to actuation of respective input mechanisms based upon the range of values associated with the one or more input mechanisms.

In another embodiment, an apparatus is provided that includes at least one processor and at least one memory including computer program code. The at least one memory and the computer program code are configured to, with the processor, cause the apparatus of this embodiment to maintain a terminal session between a server device and a client device in which the client device simulates at least a portion of the display generated at the server device, access the mapping between touch events on the server device and actuation of respective input mechanisms on the client device, interpret one or more control signals provided in response to the actuation of an input mechanism based on the mapping and cause the user interface state of the server device to be updated based on the actuation of the input mechanism of the client device. For example, the user input state may be updated by causing the focus of the display of the server device to be changed or by causing an element on the display the server device to be selected. The memory and computer program code may also be configured to, with the processor, cause the apparatus to cause the display of the client device to be updated in accordance with the display of the server device.

In regards to the mapping, the memory and computer program code of one embodiment may be further configured to, with the processor, cause the apparatus to receive an indication of one or more input mechanisms of the client device and a functional category of each input mechanism and to then generate the mapping by mapping the touch events on the server device to actuation of respective input mechanisms based upon the functional category of each input mechanism. While input mechanisms may have various functional categories, the functional categories of one embodiment include selection, change in focus and toggle. The memory and computer program code of one embodiment may also be further configured to, with the processor, cause the apparatus to receive an indication of a range of values associated with one or more input mechanisms and to generate the mapping so as to be further based on the range of values associated with one or more input mechanisms.

In a further embodiment, a computer program product comprising at least one computer-readable storage medium having computer-executable program code portion stored therein may be provided. The computer-executable program code portions may include program code instructions for maintaining a terminal session between a server device and a client device in which the client device emulates at least a portion of the display generated at the server device. The computer-executable program code portions may also include program code instructions for accessing a mapping between touch events on the server device and actuation of respective input mechanisms of the client device. Further, the computer-executable program code portions may include program code instructions for interpreting one or more control signals provided in response to actuation of an input mechanism based upon the mapping and causing a user interface state of the server device to be updated based on the actuation of the input mechanism of the client device.

In one embodiment, the computer program product is configured to generate the mapping such that the computer-executable program code portions of this embodiment include program code portions for receiving an indication that one or more input mechanisms of the client device and a functional category of each input mechanism and program code instructions for generating the mapping by mapping the touch events on the server device to actuation of respective input mechanisms based upon the functional category of each input mechanism. The program code instructions for receiving the functional category of each input mechanism may also include program code instructions for receiving an indication that the functional category of the respective input mechanism is one of selection, change in focus or toggle. In one embodiment, the computer-executable program code portions may also include program code instructions for receiving an indication of a range of values associated with one or more input mechanisms. In this embodiment, the program code instructions for generating the mapping may include program code instructions for mapping the touch events to actuation of respective input mechanisms further based on the range of values associated with one or more input mechanisms.

In a further embodiment, a apparatus is provided that includes means for maintaining a terminal session between a server device and a client device in which the client device simulates at least a portion of a display generated at the server device. The apparatus may also include means for accessing a mapping between touch events on the server device and actuation of respective input mechanisms of the client device. The apparatus may also include means for interpreting one or more control signals provided in response to actuation of an input mechanism based upon the mapping and means for causing a user interface state of the server device to be updated based on the actuation of the input mechanism of the client device. For example, the user interface state may be updated by causing the focus of the display of the server device to be changed. In this embodiment, the apparatus may include means for updating the display of the client device in accordance with the display of the server device. As another example, the updating of the user interface state may include causing an element on the display of the server device to be selected.

In regards to the mapping, the apparatus of one embodiment may also include means for receiving an indication of one or more input mechanisms of the client device and a functional category of each input mechanism and means for generating the mapping between the touch events on the server device and actuation of respective input mechanisms based upon the functional category of each input mechanism. While each input mechanism may have various functional categories, the functional categories of a respective input mechanism of one embodiment include selection, change in focus or toggle. Along with the indication of one or more input mechanisms of the client device and the functional category of each input mechanism, the apparatus of one embodiment may include means for receiving an indication of a range of values associated with one or more input mechanisms such that the mapping that is generated also maps the touch events to actuation of respective input mechanisms based upon the range of values associated with the one or more input mechanisms.

BRIEF DESCRIPTION OF THE SEVERAL VIEWS OF THE DRAWING(S)

Having thus described embodiments of the present invention in general terms, reference will now be made to the accompanying drawings, which are not necessarily drawn to scale, and wherein:

Figure 3:
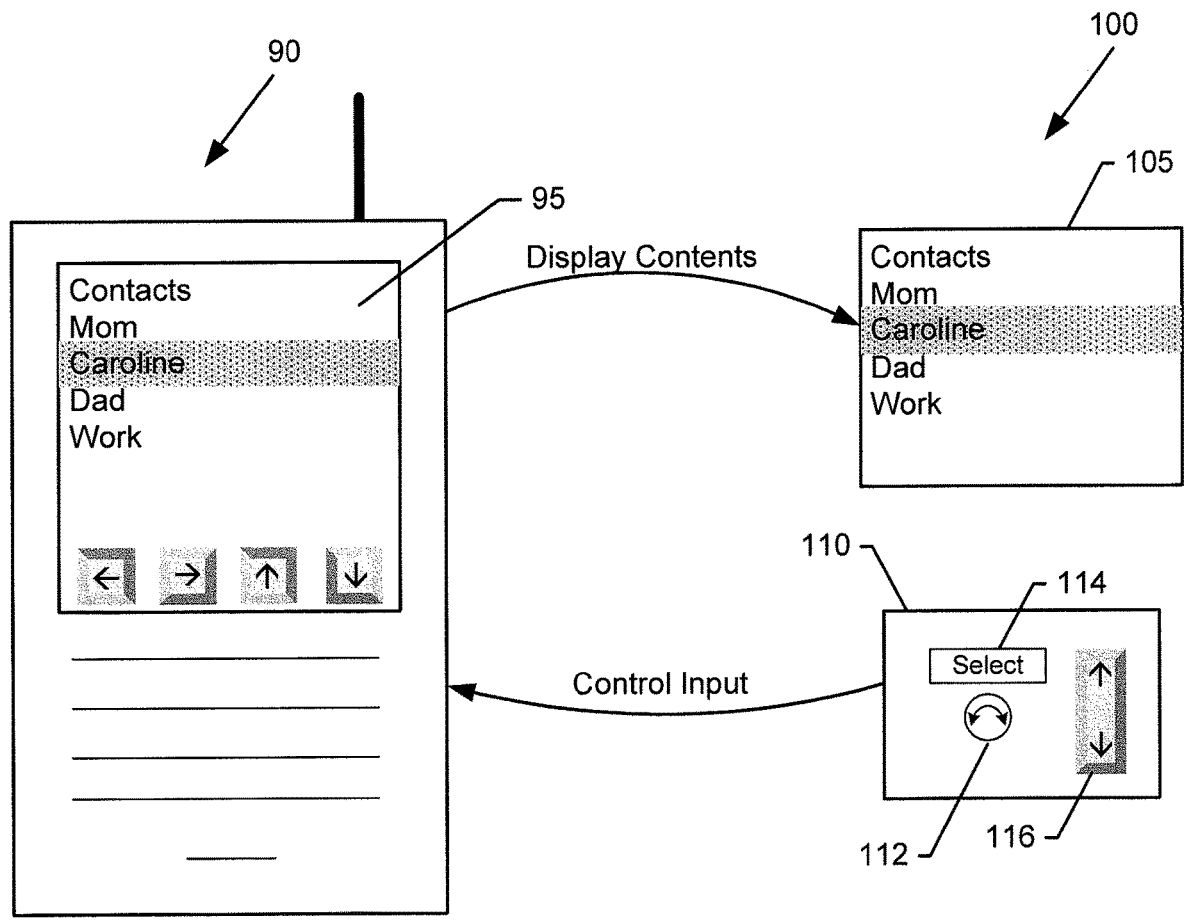
Figure 4:
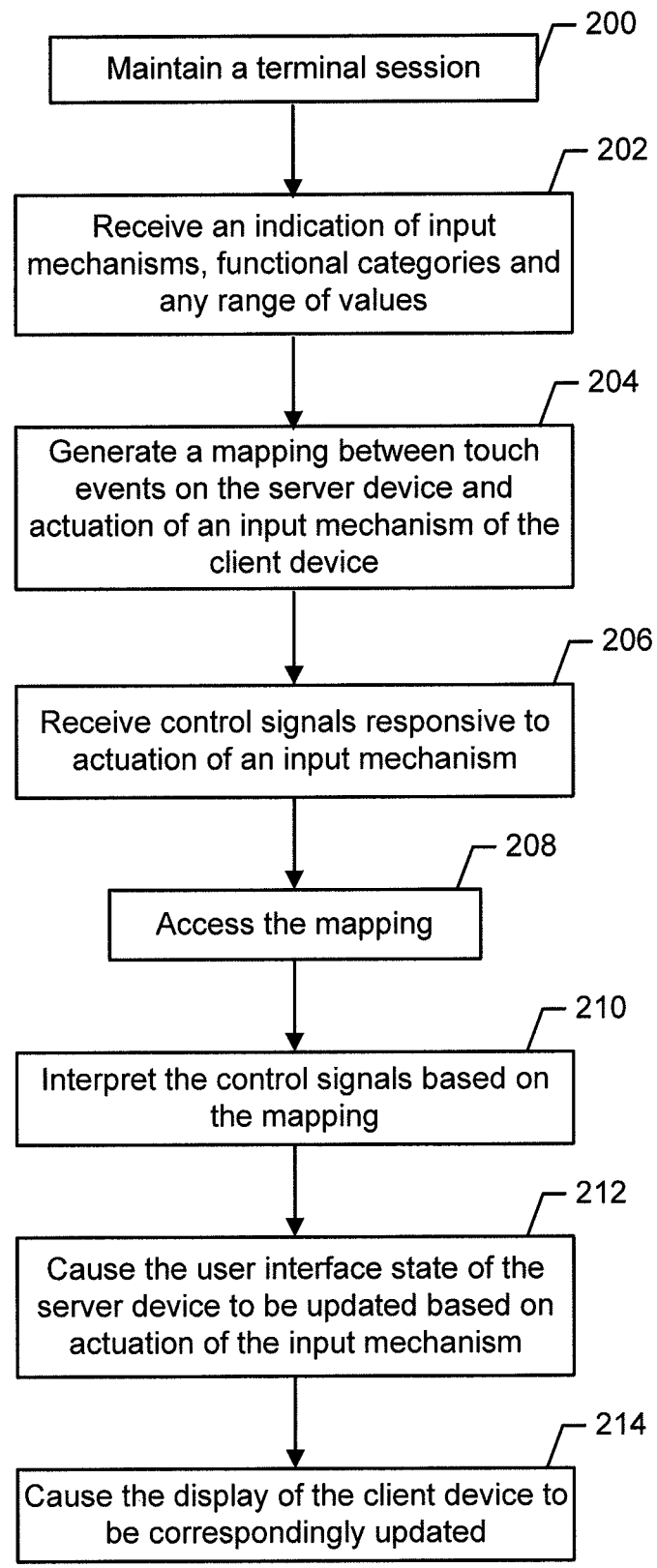

FIG. 3 is a schematic representation of the interoperability of a touch-based mobile terminal and a remote environment utilizing other types of user input devices in accordance with one embodiment of the present invention; and FIG. 4 is a flowchart illustrating operations performed in order to facilitate interoperability between server and client devices having different types of user input devices in accordance with an example embodiment of the present invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

As indicated above, mobile terminals 10 are becoming very common and very personal to their respective users. As such, some users prefer to have access to their mobile terminals at all times. When operating an automobile, for example, a user may still want to have access to his mobile terminal, for example to receive and transmit calls, listen to messages, and/or access the Internet, among other things.

In some cases, the user interface options offered by a server device, such as the mobile terminal 10, are different from the interfaces offered by certain remote environments, such as a head unit in an automobile. The server device, such as the mobile terminal, for example, may include a touch screen that allows a user to select different functions by touching certain designated areas of the screen. The remote environment or client device, however, may be a non-touch device that includes various input mechanisms, such as mechanical input mechanisms, e.g., buttons, knobs, dials or other features, for allowing a user to select different functions of the device. Accordingly, a user may prefer to engage the input mechanisms of the client device as opposed to the touch interface of the server device in certain situations. For example, where the server device is a mobile terminal and the remote environment is a vehicle head unit, the user may find it easier (and safer) to interact with the input mechanisms of the head unit, both to elicit operations of the vehicle (such as turning on the radio) and operations of the mobile terminal (such as making a phone call). As such, the non-touch remote environment should be able to communicate with the touch device to enable control functions for the touch device to be provided based on inputs received via the input mechanisms of the non-touch remote environment.

Some embodiments of the present invention may provide a mechanism by which the features and capabilities of the server device are projected onto the client device, such that interaction with the input mechanisms of the client device invokes the functionality of the server device. For example, the server device, such as a cellular telephone or personal digital assistant (PDA), may be integrated into the remote environment of the client device, such as a vehicle head unit, meeting room, audio-visual system, or living room sound system, by virtue of the physical presence of the server device in proximity to the client device (e.g., the user carries the cellular phone into the vehicle). As a result, the features and capabilities of the server device may appear as if they are inherent capabilities of the client device itself.

Figure 1:
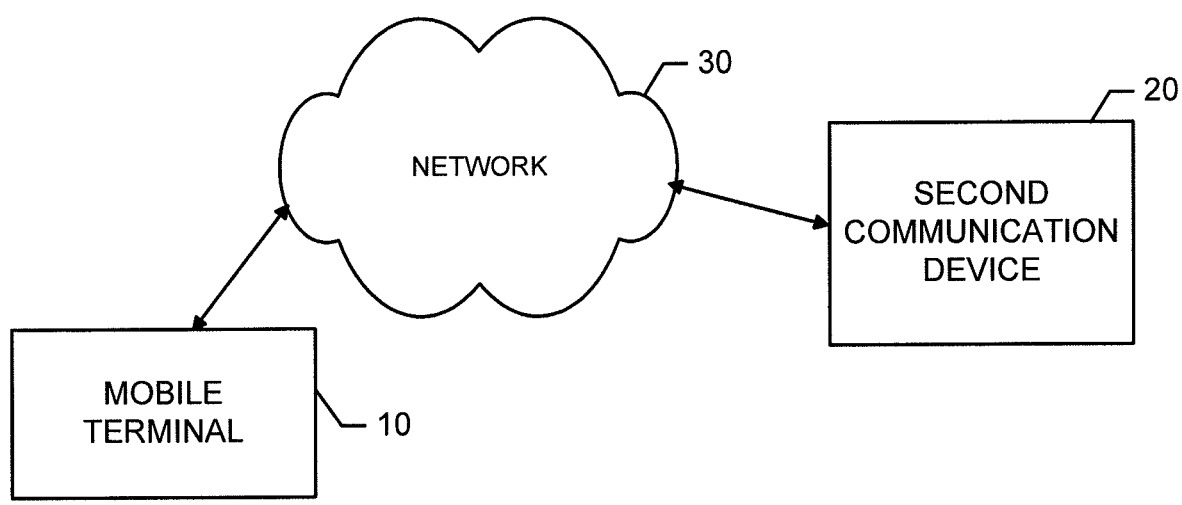
FIG. 1 illustrates one example of the communication system according to an example embodiment of the present invention.

FIG. 1 illustrates a generic system diagram in which a first communication device such as a mobile terminal 10, and a second communication device 20, such as a client device in a remote environment, either or both of which may benefit from embodiments of the present invention, is shown in an example communication environment. As shown in FIG. 1, an embodiment of a system in accordance with an example embodiment of the present invention may include a first communication device (e.g., mobile terminal 10) and a second communication device 20 capable of communication with each other. In an example embodiment, the mobile terminal 10 and the second communication device 20 may be in communication with each other via a network 30. In some cases, embodiments of the present invention may further include one or more network devices with which the mobile terminal 10 and/or the second communication device 20 may communicate to provide, request, and/or receive information.

It should be noted that although FIG. 1 shows a communication environment that may support client/server application execution, in some embodiments, the mobile terminal 10 and/or the second communication device 20 may employ embodiments of the present invention without any network communication, but instead via a direct communication link between the mobile terminal 10 and the second communication device 20. As such, for example, applications executed locally at the mobile terminal 10 and served to the second communication device 20 via a direct wired or wireless link may also benefit from embodiments of the present invention. However, it should be noted that communication techniques such as those described herein can be used not only in embedded devices, but in desktops and servers as well.

The network 30, if employed, may include a collection of various different nodes, devices, or functions that may be in communication with each other via corresponding wired and/or wireless interfaces. As such, the illustration of FIG. 1 should be understood to be an example of a broad view of certain elements of the system and not an all inclusive or detailed view of the system or the network 30. One or more communication terminals such as the mobile terminal 10 and the second communication device 20 may be in communication with each other via the network 30 or via device to device (D2D) communication and each may include an antenna or antennas for transmitting signals to and for receiving signals from a base site, which could be, for example a base station that is a part of one or more cellular or mobile networks or an access point that may be coupled to a data network, such as a local area network (LAN), a metropolitan area network (MAN), and/or a wide area network (WAN), such as the Internet. In turn, other devices such as processing elements (e.g., personal computers, server computers or the like) may be coupled to the mobile terminal 10 and/or the second communication device 20 via the network 30. By directly or indirectly connecting the mobile terminal 10 and/or the second communication device 20 and other devices to the network 30 or to each other, the mobile terminal 10 and/or the second communication device 20 may be enabled to communicate with the other devices or each other, for example, according to numerous communication protocols including Hypertext Transfer Protocol (HTTP) and/or the like, to thereby carry out various communication or other functions of the mobile terminal 10 and the second communication device 20, respectively.

Furthermore, although not specifically shown in FIG. 1, the mobile terminal 10 and the second communication device 20 may communicate in accordance with, for example, radio frequency (RF), Bluetooth (BT), Infrared (IR) or any of a number of different wireline or wireless communication techniques, including LAN, wireless LAN (WLAN), Worldwide Interoperability for Microwave Access (WiMAX), WiFi, ultra-wide band (UWB), Wibree techniques, and/or the like. As such, the mobile terminal 10 and the second communication device 20 may be enabled to communicate with the network 30 and each other by any of numerous different access mechanisms. For example, mobile access mechanisms such as wideband code division multiple access (W-CDMA), CDMA2000, global system for mobile communications (GSM), general packet radio service (GPRS), and/or the like may be supported, as well as wireless access mechanisms such as WLAN, WiMAX, and/or the like and fixed access mechanisms such as digital subscriber line (DSL), cable modems, Ethernet, and/or the like.

In example embodiments, the first communication device (e.g., the mobile terminal 10) may be a mobile communication device such as, for example, a PDA, wireless telephone, mobile computing device, camera, video recorder, audio/video player, positioning device (e.g., a GPS device), game device, television device, radio device, or various other like devices or combinations thereof. The second communication device 20 may also be a mobile device such as those listed above or other mobile or embedded devices, but could also be a fixed communication device in some instances. For example, the second communication device 20 could be an in-car navigation system, a vehicle head unit, a vehicle entertainment system, a meeting room audio-visual system, a living room entertainment system, or any of a number of other remote environments with which the mobile terminal 10 may communicate.

In an example embodiment, the network 30 may provide for virtual network computing (VNC) operation between the mobile terminal 10 and the second communication device 20. As such, for example, the mobile terminal 10 may serve as a VNC server configured to provide content originally executed or accessed by the mobile terminal 10 to the second communication device 20 acting as a VNC client (or vice versa). A VNC protocol such as RFB (remote frame buffer) or another protocol for enabling remote access to a graphical user interface may be utilized to provide communication between the mobile terminal 10 and the second communication device 20. Moreover, according to one example, the second communication device 20 may be a vehicle entertainment system (e.g., one or more speakers and one or more displays mounted in a head rest, from the ceiling, from the dashboard, or from any other portion of a vehicle such as an automobile).

Figure 2:
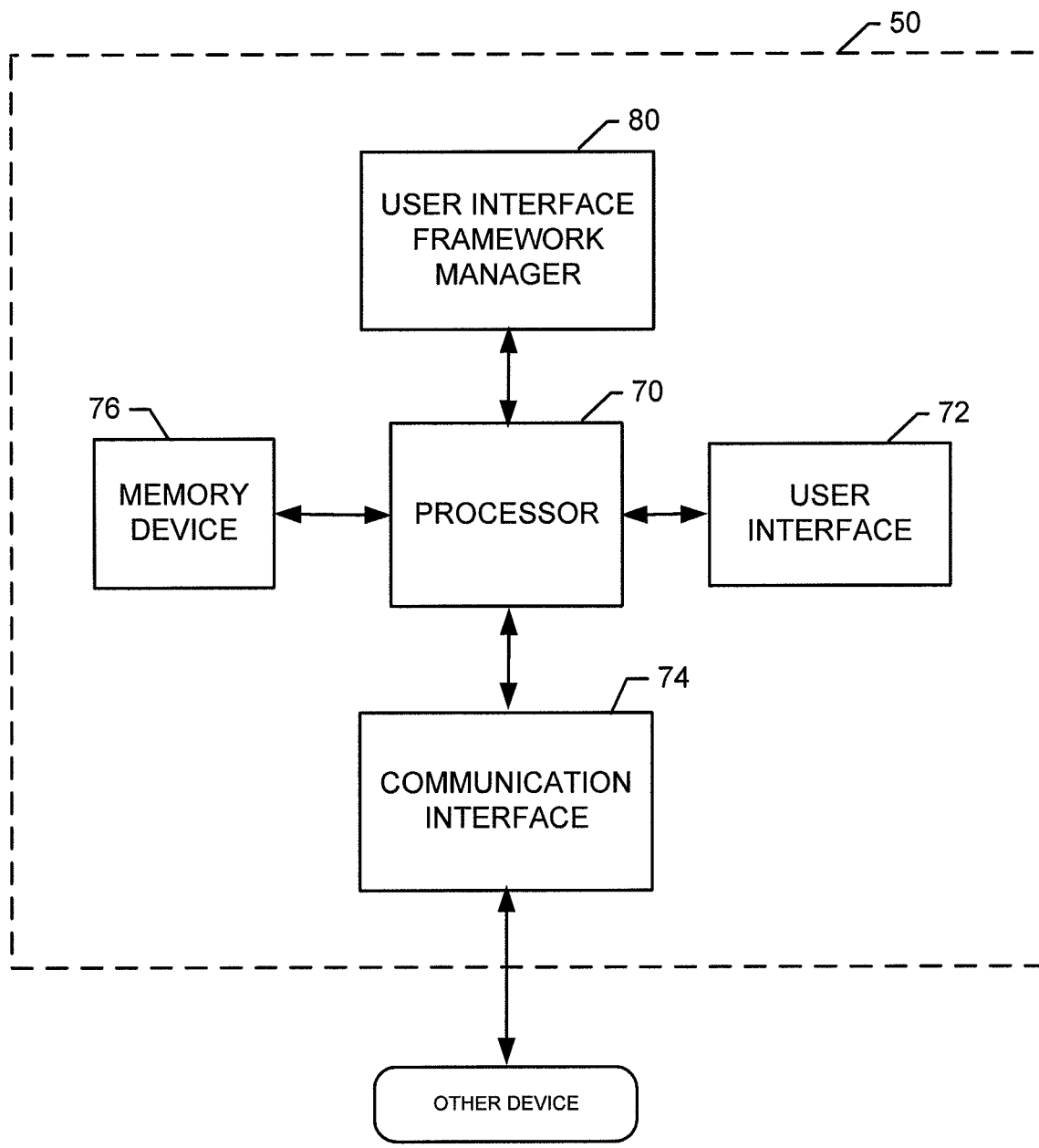
FIG. 2 illustrates a schematic diagram of an apparatus according to an example embodiment of the present invention.

In an example embodiment, the mobile terminal 10 may be configured to include or otherwise employ an apparatus according to an example embodiment of the present invention. FIG. 2 illustrates a schematic block diagram of an apparatus for providing interoperability between devices according to an example embodiment of the present invention. An example embodiment of the invention will now be described with reference to FIG. 2, in which certain elements of an apparatus 50 for providing interoperability between touch and non-touch devices are displayed. The apparatus 50 of FIG. 2 may be employed, for example, on a communication device (e.g., the mobile terminal 10 and/or the second communication device 20) or a variety of other devices, such as, for example, any of the devices listed above when such devices are acting as a server device. However, it should be noted that the components, devices, or elements described below may not be mandatory and thus some may be omitted in certain embodiments. Additionally, some embodiments may include further components, devices or elements beyond those shown and described herein. Furthermore, it should be noted that the terms "server device" and "client device" are simply used to describe respective roles that devices may play in connection with communication with each other. As such, a server device is not necessarily a dedicated server, but may be any device such as a mobile terminal that acts as a server relative to another device (e.g., a remote environment) receiving services from the server device. As such, the other device (e.g., the remote environment) may therefore be acting as a client device.

Referring now to FIG. 2, the apparatus 50 may include or otherwise be in communication with a processor 70, a user interface 72, a communication interface 74, and a memory device 76. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device). The memory device 76 may be configured to store information, data, applications, instructions or the like for enabling the apparatus to carry out various functions in accordance with example embodiments of the present invention. For example, the memory device 76 could be configured to buffer input data for processing by the processor 70. Additionally or alternatively, the memory device 76 could be configured to store instructions for execution by the processor 70.

The processor 70 may be embodied in a number of different ways. For example, the processor 70 may be embodied as one or more of various processing means such as a coprocessor, a microprocessor, a controller, a digital signal processor (DSP), a processing element with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, processing circuitry, or the like. In an exemplary embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to embodiments of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., the mobile terminal 10 or the second communication device 20) adapted for employing embodiments of the present invention by further configuration of the processor 70 by instructions for performing the algorithms and/or operations described herein. By executing the instructions or programming provided thereto or associated with the configuration of the processor 70, the processor 70 may cause corresponding functionality to be performed. The processor 70 may include, among other things, a clock, an arithmetic logic unit (ALU) and logic gates configured to support operation of the processor 70.

Meanwhile, the communication interface 74 may be any means such as a device or circuitry embodied in either hardware, software, or a combination of hardware and software that is configured to receive and/or transmit data from/to a network and/or any other device or module in communication with the apparatus. In this regard, the communication interface 74 may include, for example, an antenna (or multiple antennas) and supporting hardware and/or software for enabling communications with a wireless communication network. In some environments, the communication interface 74 may alternatively or also support wired communication. As such, for example, the communication interface 74 may include a communication modem and/or other hardware/software for supporting communication via cable, digital subscriber line (DSL), universal serial bus (USB), or other mechanisms.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a display, a touch screen, soft keys, a microphone, a speaker, or other input/output mechanisms. In this regard, for example, the processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

In an exemplary embodiment, the processor 70 may be embodied as, include or otherwise control a user interface framework manager 80. As such, in some embodiments, the processor 70 may be said to cause, direct, or control the execution or occurrence of the various functions attributed to the user interface framework manager 80 as described herein. The user interface framework manager 80 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the user interface framework manager 80 as described herein. Thus, in examples in which software is employed, a device or circuitry (e.g., the processor 70 in one example) executing the software forms the structure associated with such means.

In an example embodiment, the user interface framework manager 80 may be configured to interface with a client device (e.g., via the communication interface 74) to establish and maintain a terminal session between a server device hosting the user interface framework manager 80 and the client device in which the client device emulates at least a portion of a display presented at the server device. As such, the user interface framework manager 80 may, for example, facilitate a remote frame buffer copying process to copy frames from the content rendered at the server device (e.g., the mobile terminal 10) in a first frame buffer over to a second frame buffer at the client device (e.g., second communication device 20) for rendering at the client device. The rendering at the client device may therefore appear as an emulation of at least selected portions of the content rendered at the server device.

In an example embodiment, the user interface framework manager 80 may be further configured to receive an indication of a user input that was received, for example, at the client device and transmitted from the client device to the server device (e.g., the mobile terminal 10). The indication of the user input may identify a function to be performed at the server device.

FIG. 3 illustrates a block diagram of a client device and a server device involved in a terminal session to illustrate an example embodiment. As shown in FIG. 3, a server device 90 may be the mobile terminal 10, which may include a display 95 as a portion of the user interface of the device 90. The display 95 may be a touch screen display that is responsive to user input. The client device 100 of this example is a remote environment including a remote terminal display 105. The remote terminal display 105 may, but need not be a touch screen display, and, in the depicted embodiment, the display is a non-touch screen display.

Referring to FIG. 3, for example, in cases where the client device 100 in the remote environment is a non-touch device, such as a vehicle head unit, with user input devices 110 consisting of a rotary knob 112 and various keys or buttons 114, 116 and a non-touch screen display 105, and the server device 90 is a touch device, such as cellular phone with a touch screen display 95, the non-touch screen display of the client device may present the same or similar content or a portion of the content displayed on the touch screen display of the server device. In an example embodiment, the server device 90 may provide display content for emulation to the client device 100. Thus, as shown, the touch screen display 105 may present a "Contacts" screen that lists a number of contacts 110 that are stored on the cellular phone, for example. This same "Contacts" screen may be provided to and displayed by the client device as a result of the emulation of the server device by the client device.

If the user were interacting directly with the server device 90 (in this example, the cellular phone), the user may, for example, touch a directional key displayed on the touch screen display 95 to scroll up or down, thereby changing the "focus" of the server device from one contact to the next. In this regard, the term "focus" is used to refer to the particular user interface element that has most recently been indicated to be of interest by the user even though the user interface element has not been selected. The user interface element that is the focus may be highlighted in various manners. For example, the server device 90 may highlight the user interface element that is the focus by shading or otherwise displaying the user interface element in a different manner than the other user interface elements. In one embodiment in which the server device 90 highlights the user interface element that is the focus on the touch display 95 of the server device 90, the emulation of the display upon the client device 100 may also highlight the user interface element on the non-touch display 105 of the client device 100. In another embodiment in which the server device 90 does not highlight the user interface element that is the focus on the touch display 95 of the server device 90, the server device 90 may generate signals, an overlay (of, for example, a virtual mouse pointer) or the like that is provided to the client device to define for the client device 100 the user interface element that is the focus and the manner in which the user interface element is to be highlighted upon the non-touch display 105 of the client device 100. Alternatively, the user interface element that is the focus may be highlighted in other manners, such as by means of an audible alert, haptic feedback or the like at the client device 100. Thus, when the focus is on a particular user interface element (such as the contact "Caroline" in the figure), it is then possible to select the focused element to produce a desired output. In the depicted example, because focus is on "Caroline," touching that region of the touch display screen on which "Caroline" is displayed may select the contact entry for "Caroline" and may cause details for this contact (such as the contact's phone number) to be displayed. Thus, touching different portions of the touch display screen of the server device may provide focus to particular user interface elements or elicit certain functions.

In addition to providing focus to particular user interface elements, depressing certain keys of the touch device (in this example, the cellular phone) also elicits particular functions. In other words, to cause the touch device to achieve a desired output through interaction directly with the touch device, the user typically touches the touch screen display to switch the focus to the desired user interface element and to select the user interface element (assuming that the user interface element is actionable), thereby eliciting the function associated with selection of the user interface element.

In example embodiments of the present invention, the user is able to elicit functions of the server device 90 (e.g., the mobile terminal 10) through interaction with the non-touch remote environment of the client device 100. For example, the user may provide input to the client device 100 by activating the various input mechanisms, such as by turning a knob 112, depressing a button 114, 116 or the like, to indicate the desired function to be performed by the server device 90 (e.g., shift focus and/or produce a requested output). Thus, considering the example described above and shown in FIG. 3, the user may activate a navigation key 116 to scroll up or down so as to change the focus to the contact "Caroline". Alternatively, the user may scroll through the contacts list by rotating the knob 112. Thereafter, a selection may be made, such as by depressing a selection key 114 to bring up the contact details for this entry. Control signals indicative of the actuation of the input mechanism may then be transmitted from the client device 100 to the server device 90 to be translated into the appropriate touch events for accessing and displaying the selected contact's details from the data stored in or otherwise accessible by the server device 90. While described herein principally in conjunction with touching a user interface element, the input mechanisms may accommodate various types of touch events that are supported by the server device 90. These touch events may include multi-touch events or gestures, e.g., swiping, zooming in/out, etc.

Thus, the user interface framework manager 80 shown in FIG. 2 may be further configured to determine a corresponding touch input to elicit the identified function and to cause the identified function to be performed at the server device 90. In other words, for example, the control signals provided by the client device 100 responsive to the user's activation of the input mechanism may be mapped to a corresponding focus or selection event so that the corresponding user input may be simulated at the server device 90 and cause the desired function to be performed. For example, the user interface state may be updated by emulating a gesture (that was actually captured by the client device 100) on the server device 90, thereby causing the display of the server device 90 to be changed. For example, when interacting with a map application on the head-unit, a user may press a button to zoom in or out of the display presented by the application. Based on the control signals provided by the head-unit that indicate the zoom operation, the server device 90 may emulate a zoom in/out gesture and may provide the head-unit with the updated, e.g., zoomed, display to obtain the intended behavior from the map application. In any event, the map application is not changed and its behavior is identical to that caused by receipt of comparable user input via the touch screen of the server device 90.

In one embodiment, the user interface framework manager 80 is configured to access a mapping, such as a mapping stored by the server device 90, between touch events on the server device 90 and actuation of the respective input mechanisms of the client device 100. Utilizing the mapping, the user interface framework manager 80 may therefore interpret the control signals provided by the client device 100 responsive to actuation of an input mechanism, that is, control signals defining the input mechanism that has been actuated and, if applicable, the manner in which the input mechanism has been actuated, in order to determine the corresponding touch events on the server device 90 to produce the same result. As such, user interface framework manager 80 may then cause the user interface state of the server device to be updated based on the actuation of the input mechanism of the client device 100. In this regard, the user interface framework manager 80 may cause the user interface state of the server device 90 to be updated based on the touch events that were determined to correspond to the actuation of the input mechanism based upon the mapping therebetween. The display of the server device 90 may then be updated based upon the updated user interface state and, in one embodiment, the server device 90 may advise the client device 100 of the updated display such that the client device 100 may also emulate the updated display. In another embodiment, the user interface state of the server device 90 may be updated and the client device 100 may be advised of the updated user interface state so that the client device 100 may emulate the updated display regardless of whether the display of the server device 90 actually updated.

As noted above, some actions that are taken in response to the actuation of the respective input mechanisms of the client device 100 are not mapped to corresponding touch events of the server device 90. For example, the apparatus 50 may generate audible and/or haptic feedback or may generate an overlay for display upon the client device 100 in response to the actuation of certain input mechanisms of the client device 100. Thus, the user interface framework manager 80 may interpret at least some control signals in such a manner as to not be dependent upon the mapping, but to, instead, generate a response to the control signals, e.g., audible feedback, haptic feedback, visual overlay or the like, and may provide the response to the client device 100 for presentation to the user.

As to the mapping, the user interface framework manager 80 of one example embodiment is configured to generate the mapping between touch events on the server device 90 and actuation the respective the respective input mechanisms of the client device 100. In this regard, the user interface framework manager 80 may receive an indication of the various input mechanisms of the client device and a functional category of each input mechanism. In this regard, the functional category of each input mechanism defines the function intended upon actuation of the respective input mechanism. For example, functions may include selection, change in focus or toggle. In one example embodiment, the user interface framework manager 80 also receives a range of values associated with one or more input mechanisms. With respect to a rotary knob 112, for example, the range of values may be 0° through 360° with increments of 1° so as to indicate the different values that may be taken on by the input mechanism. For each of a plurality of different user interface states of the server device 90, the user interface framework manager 80 may then generate the mapping between the touch events on the server device 90 and the actuation of the respective input mechanisms based on the functional category of each input mechanism and, in one example embodiment, the range of values associated with one or more input mechanisms. By way of example, the user interface framework manager 80 may map input mechanisms that are representative of select or toggle controls to be equivalent to a touch event with the exception that state information, e.g., on/off, is maintained for a toggle control. As a further example, the user interface framework manager 80 may map input mechanisms that are representative of a change of focus, such as the rotation of a rotary knob 112, not to a touch event since touch-based displays do not generally have explicit mechanisms for registering focus, but to an overlaid indicator (as shown in FIG. 3) or other focus markings that is rendered upon the display to indicate the current focus. Still further, the indication of the current focus may be provided in other manners, such as by means of audible or haptic feedback as noted above. Thus, a user interface feature that is explicit in a non-touch based display, but implicit in a touch based display, such as focus, may have an indication that is rendered on the display based upon the user actuation of input mechanisms that are representative of a change of focus.

Thus, for a particular user interface state, the mapping generated by the user interface framework manager 80 may define for each input mechanism and for each value that an input mechanism may assume the corresponding change in the user interface state that will be brought about by actuation of the input mechanism. Thus, the user interface framework manager 80 may properly interpret the control signals provided by a client device 100 in response to actuation of an input mechanism by determining, from the mapping associated with the respective user interface state, the change in the user interface state occasioned by actuation of the respective input mechanism. Thus, a user may utilize the mechanical input mechanisms of the client device 100, such as a client device in a remote environment, in order to change the focus, make selections or the like from among the user interface elements displayed by the touch screen display 95 displayed or generated by the server device 90.

By way of further explanation, the flowchart of FIG. 4 illustrates the operations performed by an apparatus 50 in accordance with one example embodiment of the present invention. In this regard, the apparatus 50 may include means, such as a processor 70, for maintaining a terminal session between the server device and the client device in which the client device simulates at least a portion of the display generated at the server device. See operation 200 of FIG. 4. Although the apparatus 50 may access a predefined mapping between the touch events on the server device 90 and the actuation of the input mechanisms of a client device 100, the apparatus of one example embodiment may initially generate the mapping. In this regard, the apparatus 50 may include means, such as the processor 70, the user interface framework manager 80 or the like, for receiving an indication of one or more input mechanisms of the client device 100 and a functional category of each input mechanism and, in one example embodiment, an indication of a range of values associated with one or more input mechanisms. See operation 202. The apparatus 50 of this example embodiment may also include means, such as the processor 70, the user interface framework manager 80 or the like, for generating the mapping by mapping the touch events on the server device 90 to actuation of respective input mechanisms based upon the functional category of each input mechanism and, in one example embodiment, further based upon the range of values associated with one or more input mechanisms. See operation 204.

The apparatus 50 may also include means, such as the processor 70, the communication interface 74 or the like, for receiving control signals indicative of the actuation of an input mechanism of the client device 100. See operation 206 of FIG. 4. Since the mapping has already been generated, the apparatus 50 may include means, such as the processor 70, the user interface framework manager 80 or the like, for accessing the mapping between touch events at the server device 90 and actuation of respective input mechanisms of the client device 100. See operation 208. The apparatus 50 may also include means, such as a processor, user interface framework manager or the like, for interpreting the control signals provided in response of the actuation of the input mechanisms of the client device 100 based upon the mapping. See operation 210. The apparatus 50 may further include means, such as the processor 70, the user interface framework manager 80 or the like, for causing the user interface state of the server device 90 to be updated based on the actuation of the input mechanism of the client device 100. See operation 212. For example, the user interface state may be updated by causing the focus of the display of the server device 90 to be changed or for causing an element to the display of the server device 90 to be selected. In example embodiment, the apparatus 50 may also include means, such as the processor 70, for causing the display of the client device 100 to be updated in accordance with the display of the server device 90, thereby permitting the client device 100 to continue to emulate the display of the server device 90. See operation 214.

While the apparatus 50 may be embodied at the server device 90, such as the processor 70 of the server device 90, so as to have a smart server, the apparatus 50 may, instead, be embodied by the client device 100 such that the operations described above in conjunction with FIG. 4 are performed by the client device 100 with the apparatus 50 of the client device 100 merely advising the server device 90 of the updated user interface state so that the server device 90 may update its display. As such, the client device 100 of one example embodiment may be a smart client and the server may be a relatively dumb server. In other words, although the description and associated figures provide examples of a user interface framework manager 80 residing on a server device 90 and receiving, at the server device 90, the indication of a user input from the client device 100, it is contemplated that in some instances a user interface framework manager 80 may reside on the client device 100 and, thus, the indication may be received at the client device 100. In the same way, the mapping between the touch events at the server device 90 and the actuation of input mechanisms of the client device 100 may be generated at the client device 100 and the corresponding input for use by the server device 90 may be determined at the client device 100. Thus, in this case, the corresponding input may be transmitted from the client device 100 to the server device 90 to elicit a desired function at the server device 90. In yet another embodiment, the apparatus 50 may be distributed between the server device 90 and the client device 100, if so desired.

FIG. 4 is a flowchart of a system, method, and program product according to example embodiments of the invention. It will be understood that each block of the flowchart, and combinations of blocks in the flowchart, may be implemented by various means, such as hardware, firmware, processor, circuitry, and/or other device associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus implements the functions specified in the flowchart block(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

Accordingly, blocks of the flowchart support combinations of means for performing the specified functions, combinations of operations for performing the specified functions, and program instruction means for performing the specified functions. It will also be understood that one or more blocks of the flowchart, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
maintaining a terminal session between a server device and a client device in which the client device emulates at least a portion of a display generated at the server device;
receiving an indication of one or more input mechanisms of the client device, an associated range of values, and a functional category of each input mechanism;
in response to receiving the indication of the input mechanisms the associated range of values, and the functional category; generating a mapping by mapping touch events on the server device to actuation of respective input mechanisms based upon the functional category of each input mechanism and the associated range of values;
accessing the mapping between touch events on the server device and actuation of respective input mechanisms of the client device, wherein the mapping of the touch events and the actuation of the respective input mechanisms is based on the associated range of values;
interpreting one or more control signals provided responsive to actuation of an input mechanism based upon the mapping, wherein the input mechanism is a non-touch device configured to be mechanically moved or depressed to provide an indicated value of the mapped associated range of values; and
causing a user interface state of the server device to be updated based on the actuation of the input mechanism of the client device and the indicated value of the associated range of values based on the actuation of the input mechanism and the mapping.

2. A method according to claim 1 further comprising receiving an indication of the range of values associated with one or more input mechanisms, wherein generating the mapping comprises mapping the touch events to actuation of respective input mechanisms further based on the range of values associated with one or more input mechanisms.

3. A method according to claim 1 wherein receiving the functional category of each input mechanism comprises receiving an indication that the functional category of a respective input mechanism comprises selection, change in focus or toggle.

4. A method according to claim 1 wherein causing the user interface state to be updated comprises causing a focus of the display of the server device to be changed in response to incremental changes in the indicated value of the input mechanism based on the actuation of the input mechanism and the mapping, and wherein the method further comprises causing a display of the client device to be updated in accordance with the display of the server device.

5. A method according to claim 1 wherein causing the user interface state to be updated comprises causing an element of the display of the server device to be selected.

6. The method of claim 1, wherein the input mechanism is not a touch screen.

7. The method of claim 1, wherein generating the mapping between the touch events on the server device and the actuation of the respective input mechanisms of the client device by mapping the touch events on the server device to actuation of respective input mechanisms based upon the functional category of each input mechanism.

8. The method of claim 1, wherein causing the user interface state of the server device to be updated comprises zooming in or out, wherein a change in focus is determined based on a value of the interpreted on or more control signals.

9. The method of claim 1, wherein the range of values has an associated range of values from 0 to 360 degrees, and the interpreted one or more control signals are provided in increments of a pre-defined angle.

10. The method of claim 1, wherein the mapping is generated without use of a predefined mapping.

11. An apparatus comprising at least one processor and at least one memory including computer program code, the at least one memory and the computer program code configured to, with the processor, cause the apparatus to at least:
  maintain a terminal session between a server device and a client device in which the client device emulates at least a portion of a display generated at the server device;
  receive an indication of one or more input mechanisms of the client device, an associated range of values, and a functional category of each input mechanism;
  in response to receiving the indication of the input mechanisms, the associated range of values, and the functional category, generate a mapping by mapping touch events on the server device to actuation of respective input mechanisms based upon the functional category of each input mechanism and the associated range of values;
  access the mapping between touch events on the server device and actuation of respective input mechanisms of the client device, wherein the mapping of the touch events and the actuation of the respective input mechanisms is based on the associated range of values;
  interpret one or more control signals provided responsive to actuation of an input mechanism based upon the mapping, wherein the input mechanism is a non-touch device configured to be mechanically moved or depressed to provide an indicated value of the mapped associated range of values; and
  cause a user interface state of the server device to be updated based on the actuation of the input mechanism of the client device and the indicated value of the associated range of values based on the actuation of the input mechanism and the mapping.

12. An apparatus according to claim 11 wherein the memory and computer program code are further configured to, with the processor, cause the apparatus to receive an indication of the range of values associated with one or more input mechanisms, and to generate the mapping by mapping the touch events to actuation of respective input mechanisms further based on the range of values associated with one or more input mechanisms.

13. An apparatus according to claim 11 wherein the memory and computer program code are further configured to, with the processor, cause the apparatus to receive the functional category of each input mechanism by receiving an indication that the functional category of a respective input mechanism comprises selection, change in focus or toggle.

14. An apparatus according to claim 11 wherein the memory and computer program code are further configured to, with the processor, cause the apparatus to receive the one or more control signals prior to interpreting the one or more control signals.

15. An apparatus according to claim 11 wherein the memory and computer program code are further configured to, with the processor, cause the apparatus to cause the user interface state to be updated by causing a focus of the display of the server device to be changed in response to incremental changes in the indicated value of the input mechanism based on the actuation of the input mechanism and the mapping, and to cause a display of the client device to be updated in accordance with the display of the server device.

16. An apparatus according to claim 11 further comprising user interface circuitry configured to:
  facilitate user control of at least some functions of the apparatus through use of a display; and
  cause at least a portion of a user interface of the apparatus to be displayed on the display to facilitate user control of at least some functions of the apparatus.

17. A computer program product comprising at least one computer-readable storage medium having computer-executable program code portions stored therein, the computer-executable program code portions comprising program code instructions for:
  maintaining a terminal session between a server device and a client device in which the client device emulates at least a portion of a display generated at the server device;
  receiving an indication of one or more input mechanisms of the client device, an associated range of values, and a functional category of each input mechanism;
  in response to receiving the indication of the input mechanisms, the associated range of values, and the functional category, generating a mapping by mapping touch events on the server device to actuation of respective input mechanisms based upon the functional category of each input mechanism and the associated range of values;
  accessing a mapping between touch events on the server device and actuation of respective input mechanisms of the client device, wherein the mapping of the touch events and the actuation of the respective input mechanisms is based on an associated range of values;
  interpreting one or more control signals provided responsive to actuation of an input mechanism based upon the mapping, wherein the input mechanism is a non-touch device configured to be mechanically moved or depressed to provide an indicated value of the mapped associated range of values; and
  causing a user interface state of the server device to be updated based on the actuation of the input mechanism of the client device and the indicated value of the associated range of values based on the actuation of the input mechanism and the mapping.

18. A computer program product according to claim 17 wherein the computer-executable program code portions further comprise program code instructions for receiving an indication of the range of values associated with one or more input mechanisms, wherein the program code instructions for generating the mapping comprise program code instructions for mapping the touch events to actuation of respective input mechanisms further based on the range of values associated with one or more input mechanisms.

19. A computer program product according to claim 17 wherein the program code instructions for receiving the functional category of each input mechanism comprise program code instructions for receiving an indication that the functional category of a respective input mechanism comprises selection, change in focus or toggle.

20. A computer program product according to claim 17 wherein the computer-executable program code portions further comprise program code instructions for receiving the one or more control signals prior to interpreting the one or more control signals.

* * * * *